F. E. THOMAS.
COTTON PRESS.
APPLICATION FILED MAY 6, 1909.

935,432.

Patented Sept. 28, 1909.
2 SHEETS—SHEET 1.

Witnesses
W. A. Williams
Francis S. ——

Inventor
Frank Elsavan Thomas
By Levi H. David.
Attorney

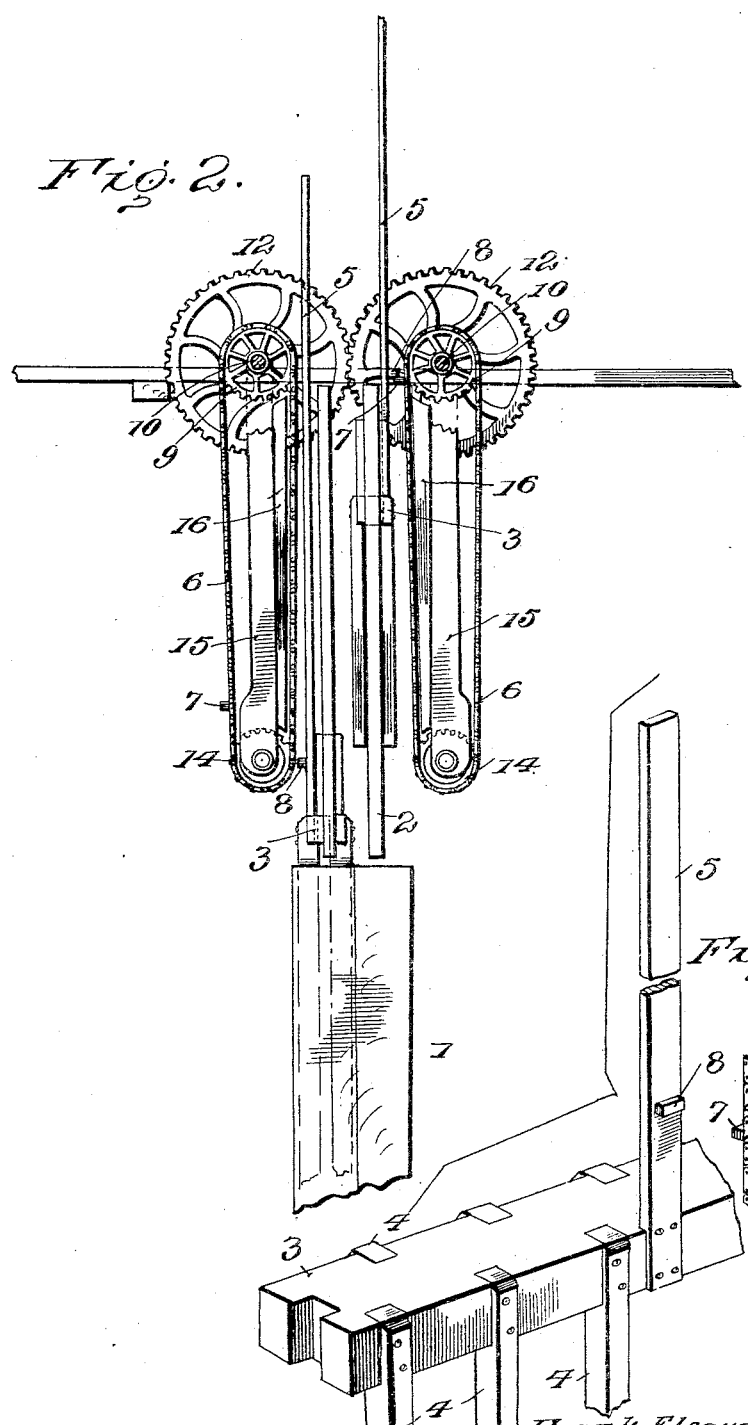

UNITED STATES PATENT OFFICE.

FRANK ELSAVAN THOMAS, OF WEDGEFIELD, SOUTH CAROLINA.

COTTON-PRESS.

935,432.     Specification of Letters Patent.   Patented Sept. 28, 1909.

Application filed May 6, 1909. Serial No. 494,287.

*To all whom it may concern:*

Be it known that I, FRANK ELSAVAN THOMAS, of Wedgefield, in the county of Sumter and State of South Carolina, have invented certain new and useful Improvements in Cotton-Presses; and I do hereby declare the following to be a full, clear, and exact description of the invention, such as will enable others skilled in the art to which it appertains to make and use the same.

The primary object of this invention is to provide simple and highly efficient means for readily and easily tamping cotton in an ordinary cotton press box as it flows from the condensers of a cotton gin and preliminary to its being pressed into bales. And a further object is to so operate the tamping members that the cotton will be held by one member until the complementary member has reached the limit of its feeding stroke, thus preventing expansion of the compressed cotton and avoiding the release thereof by the upstroke of the tampers. And a further object is to provide means for automatically raising and effecting the lowering of the tampers.

The invention will be hereinafter fully set forth and particularly pointed out in the claims.

Figure 1:
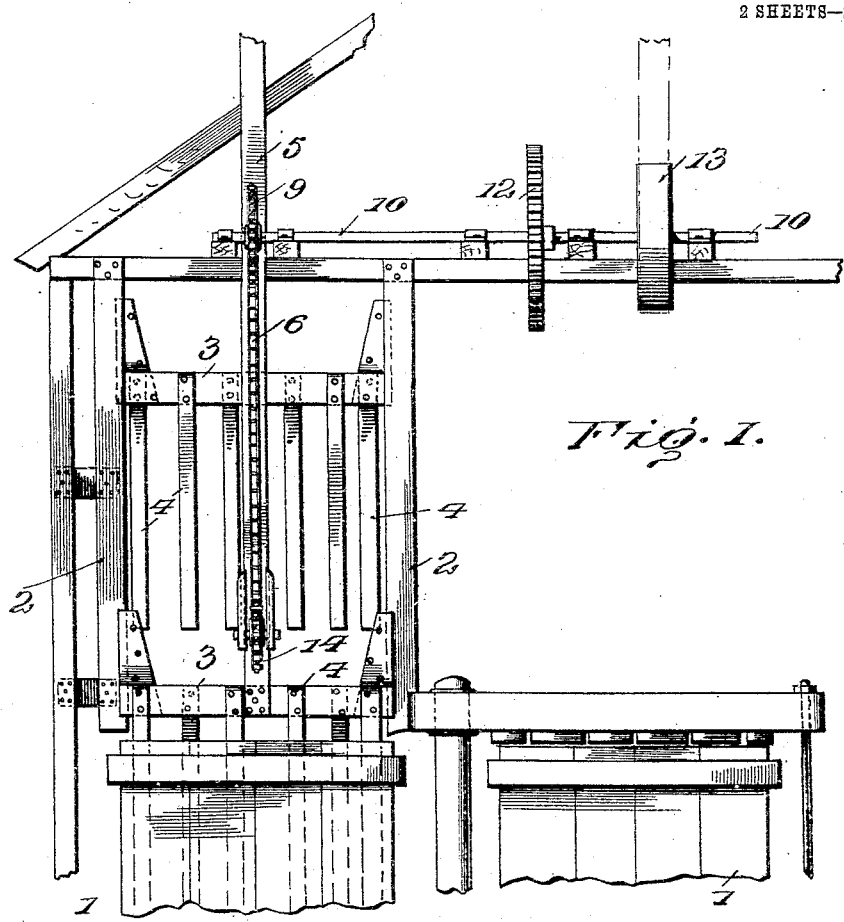
Figure 3:
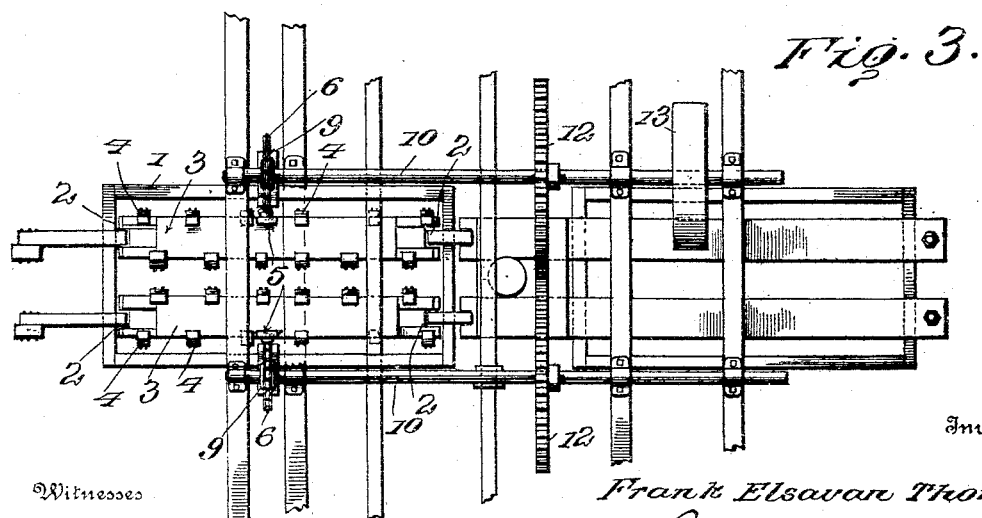

In the accompanying drawings, Figure 1 is a view in side elevation, with parts broken away. Fig. 2 is an end view, on an enlarged scale. Fig. 3 is a plan view. Fig. 4 is a fragmentary view in perspective of one of the tampers and a portion of its engaging chain.

Referring to the drawings, 1, 1, designate cotton press boxes which may be arranged in any suitable or preferred manner, it being understood that cotton is fed into a box directly from the condensers of a cotton gin and is then subjected to pressure for forming bales which are bound by suitable bands. Inasmuch as my invention has reference solely to the means for packing the cotton within the boxes preliminarily to the application of the bale forming pressure, further reference to the boxes themselves and the pressing agency will not be necessary.

Movable on upright guideways 2 above one of the boxes are two tampers 3 which are designed to be successively raised by any suitable means, preferably such as will automatically elevate the tampers to the upper ends of the guideways and then release them so that they may fall by gravity into the boxes. Each tamper is preferably composed of a cross-head having reduced ends or projections which extend into the superposed guideways 2, and a series of depending spaced-apart rods or fingers 4, which latter are shown as being in two series, depending from opposite edges of the cross-head, the fingers of one series being in staggered relation to those of the other series. These rods or fingers are designed to engage with and hold the cotton as it falls into the box, and by the weight of the tampers the cotton is pressed. Each tamper after entering the box so as to press the cotton will remain in its lowered position not only while the other or complementary tamper is being carried to the upper end of its guideway, but until such other tamper has been again lowered into engagement with a fresh supply of cotton. Thereupon the first mentioned tamper will be lifted from the box and raised to the upper end of its guideway, the second tamper serving to prevent expansion of the cotton held by the first mentioned tamper so as to prevent the up-stroke of the latter from occasioning any release of the cotton previously held by it. This operation of successively raising and lowering the tampers is continued until the box is filled with cotton.

The tampers are shown as provided with vertically disposed guide-bars 5 secured at their lower ends to the tamper cross-heads and projecting upwardly through suitable guideways, preferably formed by the timbers of the building or superstructure. While the means for effecting the successive raising and lowering of the tampers may be varied widely, yet I prefer to use for this purpose two vertically-disposed continuous chains 6, one for each tamper, each chain having a laterally projecting lug 7 for engaging with a laterally projecting lug 8 of one of the tampers so that such tampers will be carried upwardly with the chains and be automatically released therefrom at or about the termination of the upward flights of the chains so that the tampers will be allowed to drop by gravity into the cotton box. These chains are passed over upper sprocket wheels 9 on two parallel shafts 10 having their bearings in the superstructure, said shafts being geared together by intermeshing wheels 12, power being applied to one shaft by a belt pulley 13. These chains also engage two lower sprocket wheels 14 mounted in the lower ends of two hangers 15 suspended from the superstructure in line beneath shafts 10. Each hanger has a guide-bar 16 secured thereto and running parallel with one side thereof, such bars forming supports or guides for the chains in the upward flights thereof so as to prevent the lugs 7 of the chains from prematurely disengaging the lugs 8 of the tampers. When, however, the chains approach the upward limit of travel, and the links carrying the lugs 7 are clear of the guide-bars 16, such lugs will be drawn out of engagement with the lugs of the tampers as the chains pass around or over the upper sprocket wheels, thereby releasing the tampers which are permitted, being deprived of any support, to fall by gravity. The tamper elevating lugs of the two chains are so arranged relatively that the tampers will be successively raised and lowered and neither tamper will be elevated from the cotton containing box until the other tamper has been lowered into such box.

It is manifest that as the quantity of cotton increases in the box the time at which the tampers will be engaged by the lugs 7 of the chains will be gradually postponed, but the arrangement is such that the tampers will be automatically raised by the respective chains whenever the lugs of the latter engage the lugs of the former, and during the upward travel of the tampers it is impossible for them to be disengaged from the lugs of the chains until the latter are drawn away therefrom as they pass over the upper sprocket wheels.

The rods or fingers of the tampers are of such length that even in the beginning of the packing of cotton, when the tampers are lowered to the greatest extent, the crossheads do not come as low as the top of the box. In consequence, no cotton will fall on top of the cross heads and hence there is no necessity for providing means for preventing cotton from falling on the tampers as has heretofore been necessary where the crossheads are forced down into the press box. I have heretofore pointed out the advantage residing in the successive operation of the tampers so that the withdrawal of a tamper will not displace any of the cotton. It will also be observed that inasmuch as the cross heads are not lowered into the box no cotton will be withdrawn as occurs where the crossheads are lowered to a point beneath the line of feed of the cotton.

The advantages of my invention will be apparent to those skilled in the art. Not only will the tampers effectively press the cotton within a box, but all danger of the cotton being displaced by the upward or return movements of the tampers is avoided. It will also be noted that the elevation or raising of the tampers will be effected by the continuously traveling chains and will be automatically freed as they reach or approach the upper ends of their guideways so that the tampers will fall by gravity and the weight thereof serve to press the cotton.

I claim as my invention:—

1. In combination with a cotton press box, vertical guideways above such box, tampers movable in such guideways, means for successively raising such tampers in said guideways and freeing the same at or near their upper limits of travel to permit them to be successively lowered into said box, each tamper being desiged to remain in its lowered position in engagement with the cotton until another tamper has been raised from and again lowered into the box.

2. In combination with a cotton press box, and vertically-disposed guideways above the latter, a plurality of tampers movable in said guideways and designed to enter said box, and continuously operating means for periodically raising each tamper in its respective guideway and releasing it at the top thereof so that it may fall by gravity into said box, the several tampers being successively so raised and released.

3. In combination with a cotton press box, and vertically-disposed guideways above the latter, a plurality of tampers movable in said guideways and designed to enter said box, and continuously operating chains carrying means for periodically engaging and raising each tamper in its respective guideway, and such means being automatically disengaged from its respective tamper at or near the upper end of said guideway so that the release tamper may fall by gravity into the box, the several tampers being successively so raised and released.

4. In combination with a cotton press box, and vertically-disposed guideways, a plurality of tampers movable in said guideways and designed to enter said box, each tamper having a lateral projection, and continuously operating chains having projections for engaging the projections of the tampers, and means for releasing the tampers at or near the upper limit of travel thereof, said tampers being designed to be successively raised and allowed to fall into said box.

5. In combination with a cotton press box, and vertically-disposed guideways, a plurality of tampers movable in said guideways and designed to enter said box, continuously operating chains having lateral projections for engaging projections of said tampers and raising the same in said guideways, upper and lower sprockets for said chains, vertically-disposed guides for the upwardly moving flights of said chains, and means for operating the latter so as to effect the successive raising and lowering of said tampers.

6. In combination with a cotton press box, a superstructure, and vertically-disposed guideways, of tampers movable in said guideways, guide bars extending from said tampers, guides therefor, horizontally-disposed operating shafts, means for actuating the same, sprocket wheels on said shafts, hangers in vertical line with said shafts, sprocket wheels on the lower end of said hangers, chains arranged in series engaging said sprocket wheels, and means carried by said chains for successively raising the tampers in their guideways and freeing the same at the upper ends thereof.

7. In combination with a cotton press box, and a vertically-disposed guideway, a tamper movable in said guideway and having a lateral projection, an endless chain having means for engaging said projection in the upward flight of such chain to raise said tamper in its guideway, means for preventing disengagement of the chains from the tamper in the upward travel of the latter, and means for automatically releasing the tamper at or near the upper end of said guideway to permit the tamper to fall by gravity into said box.

8. In combination with a cotton press box, and vertically disposed guideways, a tamper composed of a cross-head designed to move in said guideways, and a series of spaced-apart fingers or rods, such rods or fingers being of greater depth than the length of the box so that the cross-head will not have to enter the box in pressing the cotton.

In testimony whereof, I have signed this specification in the presence of two subscribing witnesses.

FRANK ELSAVAN THOMAS.

Witnesses:
  FRANCIS S. MAGUIRE,
  JOHN A. MURPHY.